(12) United States Patent
Liu et al.

(10) Patent No.: US 11,403,874 B2
(45) Date of Patent: Aug. 2, 2022

(54) VIRTUAL AVATAR GENERATION METHOD AND APPARATUS FOR GENERATING VIRTUAL AVATAR INCLUDING USER SELECTED FACE PROPERTY, AND STORAGE MEDIUM

(71) Applicant: BEIJING SENSETIME TECHNOLOGY DEVELOPMENT CO., LTD., Beijing (CN)

(72) Inventors: Tinghao Liu, Beijing (CN); Lichen Zhao, Beijing (CN); Quan Wang, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 103 days.

(21) Appl. No.: 16/994,148

(22) Filed: Aug. 14, 2020

(65) Prior Publication Data

US 2020/0380246 A1 Dec. 3, 2020

Related U.S. Application Data

(63) Continuation of application No. PCT/CN2020/074597, filed on Feb. 10, 2020.

(30) Foreign Application Priority Data

May 15, 2019 (CN) .......................... 201910403642.9

(51) Int. Cl.
  *G06T 13/40* (2011.01)
  *G06V 40/16* (2022.01)
  *G06V 30/194* (2022.01)

(52) U.S. Cl.
  CPC ............ *G06V 40/168* (2022.01); *G06T 13/40* (2013.01); *G06V 30/194* (2022.01)

(58) Field of Classification Search
  None
  See application file for complete search history.

(56) References Cited

U.S. PATENT DOCUMENTS 10,650,564 B1 * 5/2020 Lin ........................ G06V 10/82
2010/0149177 A1 6/2010 Miller
(Continued)

FOREIGN PATENT DOCUMENTS

CN 104091148 A 10/2014
CN 105354869 A 2/2016
(Continued)

OTHER PUBLICATIONS

Japanese Patent Office Action Issued in Application No. 2020-558437, dated Dec. 7, 2021, 6 pages.
(Continued)

*Primary Examiner* — Vu Nguyen (57) ABSTRACT

A virtual avatar generation method includes: determining a target task associated with at least one target face property, where the at least one target face property is one of a plurality of predefined face properties respectively; performing, according to the target task, target face property analysis on a target image including at least a face to obtain a target face property feature associated with the target face property of the target image; determining a target virtual avatar template corresponding to the target face property feature according to predefined correspondence between face property features and virtual avatar templates; and generating a virtual avatar of the target image based on the target virtual avatar template.

15 Claims, 5 Drawing Sheets

(56) References Cited

U.S. PATENT DOCUMENTS

| | | | |
|---|---|---|---|
| 2016/0125270 A1* | 5/2016 | Gokturk | G06F 16/583 |
| | | | 382/118 |
| 2017/0286752 A1* | 10/2017 | Gusarov | G06T 13/40 |
| 2018/0024726 A1* | 1/2018 | Hviding | G06V 40/171 |
| | | | 715/204 |

FOREIGN PATENT DOCUMENTS

| | | | |
|---|---|---|---|
| CN | 106529402 A | 3/2017 | |
| CN | 106652015 A | 5/2017 | |
| CN | 107730573 A | 2/2018 | |
| CN | 109271884 A | 1/2019 | |
| CN | 109345636 A | 2/2019 | |
| CN | 109447895 A | 3/2019 | |
| CN | 110111246 A | 8/2019 | |
| JP | 2006114024 A | 4/2006 | |
| KR | 20120130627 A | 12/2012 | |
| KR | 20160083900 A | 7/2016 | |
| KR | 20180097915 A | 9/2018 | |
| WO | 2017171142 A1 | 10/2017 | |

OTHER PUBLICATIONS

Korean Office Action Issued in Application No. 10-2020-7015327, dated Oct. 27, 2021, 10 pages.
International Search Report Issued in Application No. PCT/CN2020/074597, dated May 14, 2020, WIPO, 4 pages.
Office Action and Search Report Issued in Chinese Application No. 2019104036429, dated Mar. 3, 2021, 19 pages.
Office Action for Taiwan Application No. 109115910, dated Jan. 5, 2021, 10 pages.
State Intellectual Property Office of the People's Republic of China, Office Action and Search Report Issued in Application No. 201910403642.9, dated Sep. 8, 2021, 15 pages. (Submitted with Machine Translation).
ISA State Intellectual Property Office of the People's Republic of China, International Search Report Issued in Application No. PCT/CN2020/074597, dated May 14, 2020, WIPO, 2 pages.(Official English Translation).
TW Patent Office, Decision of Rejection Issued in Application No. 109115910, dated Aug. 9, 2021, 5 pages. (Submitted with Machine Translation).
Korean Intellectual Property Office, Decision of Rejection Issued in Application No. 10-2020-7015327, dated Apr. 22, 2022, 8 pages.

* cited by examiner

VIRTUAL AVATAR GENERATION METHOD AND APPARATUS FOR GENERATING VIRTUAL AVATAR INCLUDING USER SELECTED FACE PROPERTY, AND STORAGE MEDIUM

CROSS-REFERENCE TO RELATED APPLICATIONS

This patent application is a continuation application of International Application No. PCT/CN2020/074597, filed on Feb. 10, 2020, which claims priority to Chinese Patent Application No. 201910403642.9, filed on May 15, 2019 and entitled "Virtual Avatar Generation Method And Apparatus, And Storage Medium", both of which are incorporated herein by reference in their entirety.

TECHNICAL FIELD

The present disclosure relates to the field of image processing, and in particular, to a virtual avatar generation method and apparatus, and a storage medium.

BACKGROUND

Face feature point positioning refers to the calculation of respective positions of a number of predefined feature points on a picture including a face, such as a corner of an eye, a corner of a mouth, a nose tip and the like. At present, face feature point positioning can define some simple features on the face, such as eye contour and mouth contour, but cannot accurately position finer feature information.

SUMMARY

In view of this, the present disclosure provides a virtual avatar generation method and apparatus, and a storage medium.

According to a first aspect of embodiments of the present disclosure, an virtual avatar generation method is provided, comprising: determining a target task associated with at least one target face property, wherein the target face property is one of a plurality of predefined face properties; performing, according to the target task, target face property analysis on a target image comprising at least a face, to obtain a target face property feature associated with the target face property of the target image; determining a target virtual avatar template corresponding to the target face property feature according to predefined correspondence between face property features and virtual avatar templates; and generating a virtual avatar of the target image based on the target virtual avatar template.

In some optional embodiments, performing the target face property analysis on the target image comprises: determining a target neural network corresponding to the target face property; inputting the target image into the target neural network to obtain estimated values output from the target neural network, wherein the estimated values represent respective probabilities that the target image has one or more face property features associated with the target face property; and taking, as the target face property feature, a face property feature corresponding to a maximum value among the estimated values output from the target neural network.

In some optional embodiments, the target face property comprises at least one predefined subclass; and taking the face property feature corresponding to the maximum value as the target face property feature comprises: for a first subclass of the at least one subclass included in the target face property, taking, as the target face property feature corresponding to the first subclass, a face property feature corresponding to a maximum value among the estimated values output from the target neural network for the first subclass.

In some optional embodiments, the target neural network is trained by: inputting at least one sample image comprising at least a face into a first neural network, wherein each of the at least one sample image is labeled with at least one face property feature that is associated with a first face property of the plurality of predefined face properties, and the first neural network comprises a first sub-network corresponding to the first face property; and training the first sub-network by taking at least one face property feature which is output from the first neural network and is associated with the first face property of the at least one sample image as a predicted value, and taking the at least one face property feature which is labeled on the at least one sample image and corresponds to the first face property as a real value, so as to obtain the target neural network after the training.

In some optional embodiments, the first sub-network has a network structure of a residual neural network and comprises at least one residual unit.

In some optional embodiments, each of the at least one residual unit comprises at least one convolutional layer and at least one batch normalization layer; and in a case where the at least one residual unit comprises a plurality of residual units, a number of convolutional layers and a number of batch normalization layers included in a second residual unit of the plurality of residual units both are greater than that included in a first residual unit of the plurality of residual units.

In some optional embodiments, the first sub-network further comprises an output segmentation layer, and the output segmentation layer is configured to segment, according to one or more predefined subclasses included in the first face property, feature information extracted from the sample image, to obtain respective estimated values for one or more face property features respectively associated with the one or more subclasses.

In some optional embodiments, the method further comprises: performing affine transformation on an image of interest to obtain a frontalized face image; and clipping an image of a target region from the frontalized face image to obtain the target image or the sample image, wherein the target region comprises at least a region where a face key point is located. In addition, optionally, the target region further comprises a region with a preset area outside a face part corresponding to the target face property.

According to a second aspect of the embodiments of the present disclosure, an virtual avatar generation apparatus is provided, comprising: a task determination module, configured to determine a target task associated with at least one target face property, wherein the target face property is one of a plurality of predefined face properties; a face property analysis module, configured to perform, according to the target task, target face property analysis on a target image comprising at least a face, to obtain a target face property feature associated with the target face property of the target image; a virtual avatar template determination module, configured to determine a target virtual avatar template corresponding to the target face property feature according to predefined correspondence between face property features and virtual avatar templates; and an avatar generation module, configured to generate a virtual avatar of the target image based on the target virtual avatar template.

In some optional embodiments, the face property analysis module comprises: a network determination sub-module, configured to determine a target neural network corresponding to the target face property; an estimated value determination sub-module configured to input the target image into the target neural network to obtain estimated values output from the target neural network, wherein the estimated values represent respective probabilities that the target image has one or more face property features associated with the target face property; and a feature determination sub-module, configured to take, as the target face property feature, a face property feature corresponding to a maximum value among the estimated values output from the target neural network.

In some optional embodiments, the target face property comprises at least one predefined subclass; and the feature determination sub-module is configured to: for a first subclass of the at least one subclass included in the target face property, take, as the target face property feature corresponding to the first subclass, a face property feature corresponding to a maximum value among the estimated values output from the target neural network for the first subclass.

In some optional embodiments, the apparatus further comprises a training module, and the training module is configured to: input at least one sample image comprising at least a face into a first neural network, wherein each of the at least one sample image is labeled with at least one face property feature that is associated with a first face property of the plurality of predefined face properties, and the first neural network comprises a first sub-network corresponding to the first face property; and train the first sub-network by taking at least one face property feature which is output from the first neural network and is associated with the first face property of the at least one sample image as a predicted value, and taking the at least one face property feature which is labeled on the at least one sample image and corresponds to the first face property as a real value, and take the trained first sub-network as the target neural network.

In some optional embodiments, the first sub-network has a network structure of a residual neural network and comprises at least one residual unit.

In some optional embodiments, each of the at least one residual unit comprises at least one convolutional layer and at least one batch normalization layer; and in a case where the at least one residual unit comprises a plurality of residual units, a number of convolutional layers and a number of batch normalization layers included in a second residual unit of the plurality of residual units both are greater than that included in a first residual unit of the plurality of residual units.

In some optional embodiments, the first sub-network further comprises an output segmentation layer, and the output segmentation layer is configured to segment, according to one or more predefined subclasses included in the first face property, feature information extracted from the sample image, to obtain respective estimated values for one or more face property features respectively associated with one or more subclasses.

In some optional embodiments, the apparatus further comprises: a face frontalization processing module, configured to perform affine transformation on an image of interest to obtain a frontalized face image; and an image clip module, configured to clip an image of a target region from the frontalized face image to obtain the target image or the sample image, wherein the target region comprises at least a region where a face key point is located. In addition, optionally, the target region further comprises a region with a preset area outside a face part corresponding to the target face property.

According to a third aspect of the embodiments of the present disclosure, provided is a computer-readable storage medium, storing a computer program for implementing the virtual avatar generation method according to any one item of the first aspect.

According to a fourth aspect of the embodiments of the present disclosure, provided is a virtual avatar generation apparatus, comprising: a processor; and a memory storing instructions executable by the processor; where the processor is configured to invoke the instructions stored in the memory to implement the virtual avatar generation method according to any one item of the first aspect.

In the embodiments of the present disclosure, face property features on a target image including at least a face may be extracted according to a target task associated with at least one face property, then, a target virtual avatar template corresponding to the target image is determined according to predefined correspondence between face property features and virtual avatar templates, and a virtual avatar of the target image is generated based on the target virtual avatar template. Through the target task associated with the at least one face property, more accurate face property analysis is performed on the image including at least the face to generate a virtual avatar, thereby providing rich initialization face property patterns for a user.

It should be understood that the above general description and the following detailed description are merely exemplary and explanatory, and are not intended to limit the present disclosure.

BRIEF DESCRIPTION OF THE DRAWINGS

The accompanying drawings here, which are incorporated into the specification and constitute a part of the specification, illustrate embodiments that conform to the present disclosure and are used together with the specification to explain the principles of the present disclosure.

DETAILED DESCRIPTION OF THE EMBODIMENTS

Exemplary embodiments will be described here in detail, and examples thereof are represented in the accompanying drawings. When the following description relates to the accompanying drawings, unless otherwise indicated, the same numbers in different accompanying drawings represent the same or similar elements. The implementations described in the following exemplary embodiments do not represent all implementations consistent with the present disclosure. On the contrary, they are merely examples of apparatuses and methods consistent with some aspects of the present disclosure as detailed in the appended claims.

Terms in the present disclosure are merely for describing specific embodiments and are not intended to limit the present disclosure. The singular forms "one", "the", and "this" in the present disclosure and the appended claims are also intended to include a multiple form, unless other meanings are clearly represented in the context. It should also be understood that the term "and/or" in the present disclosure refers to any or all of possible combinations including one or more associated listed items.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to a determination".

The embodiments of the present disclosure provide a virtual avatar generation method, which may be performed by a face-driven device, such as Avatar.

Figure 1:
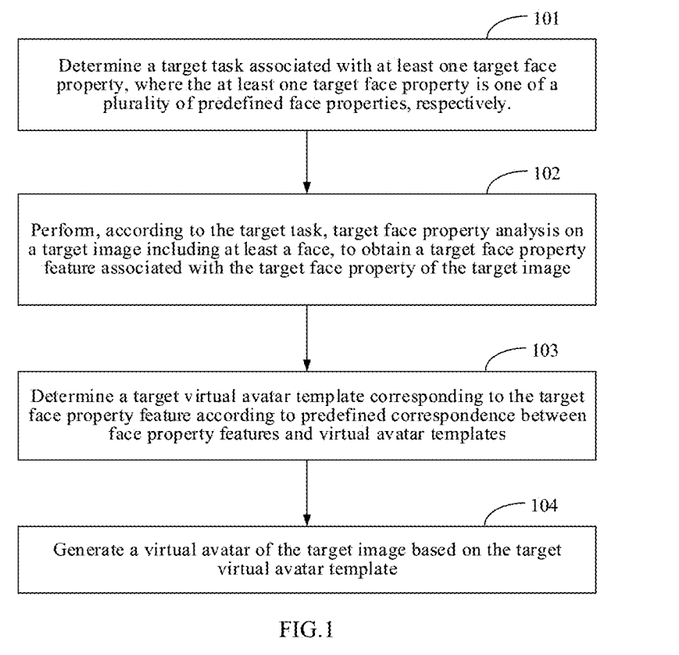
FIG. 1 is a flowchart of a virtual avatar generation method according to an exemplary embodiment of the present disclosure.

As shown in FIG. 1, FIG. 1 is an example of a virtual avatar generation method according to embodiments of the present disclosure.

At step 101, a target task associated with at least one target face property is determined. The at least one target face property is one of a plurality of predefined face properties, respectively.

In the embodiments of the present disclosure, face property may include, but is not limited to, hairstyle, beards, glasses, eyelids, etc.

The face-driven device may provide the plurality of predefined face properties for a user, and the user determines a target face property to be analyzed from these face properties according to own requirements. The target task may include analyzing the at least one face property. For example, the target task may include analyzing the hairstyle, or analyzing the beards, eyelids, etc.

At step 102, according to the target task, target face property analysis is performed on a target image including at least a face to obtain a target face property feature associated with the target face property of the target image.

When the face-driven device performs face property analysis on a target image captured by a camera, it is possible to only analyze the target face property corresponding to the target task, so as to obtain a target face property feature associated with the target face property of the target image.

For example, assuming that the target face property is the eyelids, the eyelids may be associated with a plurality of predefined features, for example, including monolids, tapered double eyelids, parallel double eyelids, hooded double eyelids, etc. The face-driven device may obtain a target face property feature, such as the parallel double eyelids, by performing face property analysis concerning the eyelids on the target image.

At step 103, a target virtual avatar template corresponding to the target face property feature is determined according to predefined correspondence between face property features and virtual avatar templates.

The face-driven device may store the predefined correspondence between the face property features and the virtual avatar templates. For example, each virtual avatar template corresponds to at least one face property feature. Optionally, the virtual avatar template may use a cartoon character image.

The face-driven device may determine, after determining the target face property feature, a target virtual avatar template corresponding to the target face property feature in a pre-stored virtual avatar template library. The number of the target virtual avatar templates may be one or more, and no limitation is made thereto in the present disclosure.

At step 104, a virtual avatar of the target image is generated based on the target virtual avatar template.

In the face-driven device such as Avatar, the target virtual avatar template may be directly taken as a virtual avatar to be generated of the target image.

If the number of the target virtual avatar templates is multiple, the user may select one of them as a virtual avatar, and the face-driven device generates the virtual avatar of the target image.

Figure 2:
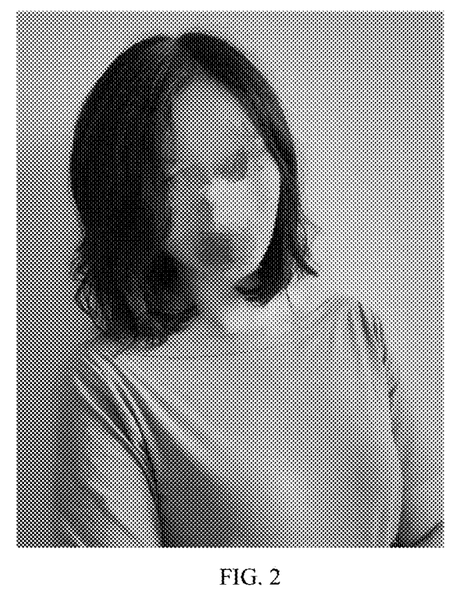
FIG. 2 is an exemplary diagram of virtual avatar generation according to an exemplary embodiment of the present disclosure.
Figure 3:
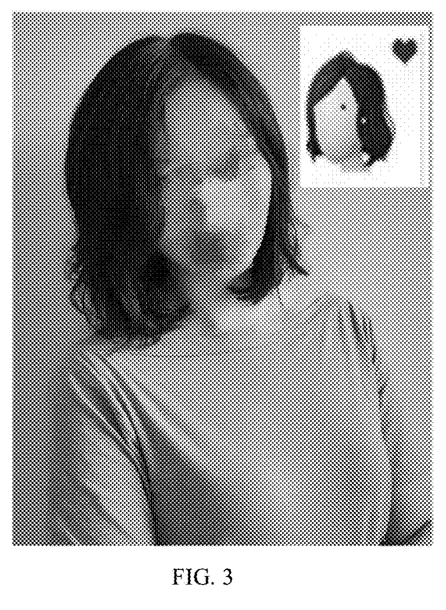
FIG. 3 is an exemplary diagram of another virtual avatar generation according to an exemplary embodiment of the present disclosure.

For example, assuming that the target image is shown in FIG. 2, and the target task is face property analysis on the hairstyle, the generated virtual avatar may be as shown in the upper right corner of FIG. 3.

In the foregoing embodiments, a face property feature on a target image including at least a face may be extracted according to a target task associated with at least one face property, a target virtual avatar template corresponding to the target image is then determined in combination with predefined correspondence between face property features and virtual avatar templates, and a virtual avatar of the target image is generated based on the target virtual avatar template. Therefore, more accurate face property analysis may be performed on the image including at least the face, and accordingly, the generated virtual avatar may provide richer initialization face property patterns for the user.

Figure 4:
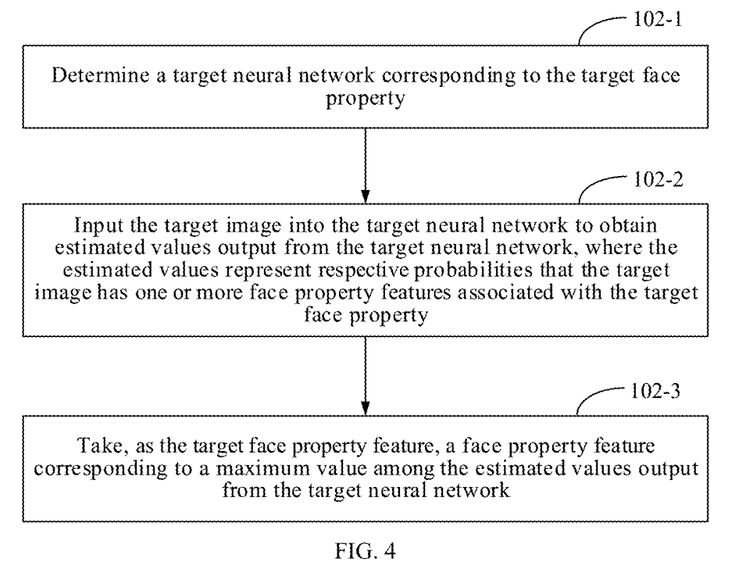
FIG. 4 is a flowchart of another virtual avatar generation method according to an exemplary embodiment of the present disclosure.

In some optional embodiments, for example, as shown in FIG. 4, step 102 may include the following steps.

At step 102-1, a target neural network corresponding to the target face property is determined.

In the embodiments of the present disclosure, a target neural network corresponding to the target face property may be trained for the target task, which is associated with the at least one face property. When the target task needs to be performed, the target neural network may be taken as a corresponding neural network for subsequent face property analysis.

At step 102-2, the target image is input into the target neural network to obtain estimated values output from the target neural network, where the estimated values represent respective probabilities that the target image has one or more face property features associated with the target face property.

The face-driven device may input the target image including at least the face into the target neural network, and the target neural network outputs the estimated values representing respective probabilities that the target image has one or more face property features associated with the target face property. An estimated value representing the probability that the target image has a certain face property feature may also be simply expressed as an estimated value for the face property feature, or an estimated value of the face property feature.

For example, assuming that the target face property is eyelids, the target neural network may output estimated values representing respective probabilities that the target image has one or more face property features associated with the eyelids, as shown in Table 1, respectively.

TABLE 1

| Face property features | Estimated values of probabilities |
| --- | --- |
| Monolids | 0.1 |
| Tapered double eyelids | 0.6 |
| Parallel double eyelids | 0.2 |
| Hooded double eyelids | 0.1 |

At step 102-3, the face property feature corresponding to a maximum value among the estimated values output from the target neural network is taken as the target face property feature.

For example, according to Table 1, the face property feature corresponding to a maximum value 0.6 among the estimated values, that is, tapered double eyelids, may be taken as the target face property feature.

In some optional embodiments, the above-mentioned face properties may be classified to obtain at least one subclass that each face property includes, respectively, to more accurately describe the face properties. The classification approach may include, but is not limited to, the manners shown in Table 2.

TABLE 2

| Face properties | Subclasses of face properties |
| --- | --- |
| Hairstyle | Fringe, curly hair, hair length |
| Beards | In the philtrum, in the center of the jaw, on both sides of the jaw |
| Glasses | Glasses type, frame type, lens shape, frame thickness |
| Eyelids | Monolids, tapered double eyelids, parallel double eyelids, hooded double eyelids |

Further, the subclasses of face property may each includes at least one face property feature, for example, as shown in Table 3.

TABLE 3

| Face properties | Subclasses of face properties | Face property features |
| --- | --- | --- |
| Hairstyle | Fringe | No fringe, having a fringe, center parting, left swept fringe, right swept fringe |
| | Curly hair | No hair, straight hair, waves, curls |
| | Hair length | Short hair without covering ears, short hair with shoulder length, long hair |
| Beards | In the philtrum | No beards in the philtrum, beards growing in the philtrum but not continuous, beards growing in the philtrum but not thick, thick beards growing in the philtrum |
| | In the center of the jaw | No beards in the center of the jaw, beards growing in the center of the jaw and under the mouth, beards growing in the center of the jaw and all under the mouth, goatee beards growing in the center of the jaw and connected to the beards above the mouth |
| | On both sides of the jaw | No beards on both sides of the jaw, sparse beards growing on both sides of the jaw, thick beards growing on both sides of the jaw |
| Glasses | Glasses type | No glasses, transparent lenses, sunglasses |
| | Frame type | No frame, full frame, half frame |
| | Lens shape | No lenses, rectangular lenses, round lenses, square lenses |
| | Frame thickness | No frame, thick frame, thin frame |
| Eyelids | Monolids | Monolids |
| | Tapered double eyelids | Tapered double eyelids |
| | Parallel double eyelids | Parallel double eyelids |
| | Hooded double eyelids | Hooded double eyelids |

The classification of the face properties in the present disclosure includes, but is not limited to, the manners described above.

In the embodiments of the present disclosure, according to the classification in Table 3, the target face property needed to be analyzed by the target task may include at least one predefined subclass. For example, if the target face property is hairstyle, the face property, the hairstyle, includes three subclasses, which are fringe, curly hair, and hair length respectively. Each different subclass of face property further includes at least one face property feature. The sum of the estimated values of all face property features associated with each subclass is 1. For example, for the subclass of the curly hair, the estimated values respectively corresponding to the four face property features, i.e., no hair, straight hair, waves, and curls, may be 0.1, 0.6, 0.2, and 0.1, respectively, and the sum is 1.

Accordingly, in the foregoing embodiments, for any one of the at least one subclass of the target face property, after the target neural network outputs an estimated value of a probability of at least one face property feature associated with the subclass, the face-driven device takes the face property feature corresponding to a maximum value among the estimated values for the subclass output from the target neural network as the target face property feature corresponding to the subclass. For example, assuming that the target face property is hairstyle, where the face property feature corresponding to a maximum value among estimated values for the subclass, fringe, is no fringe; the face property feature corresponding to a maximum value among estimated values for the subclass, curly hair, is straight hair; and the face property feature corresponding to a maximum value among estimated values for the subclass, hair length, is short hair with shoulder length. Finally, the face-driven device may respectively take the three face property features, i.e., no fringe, straight hair, and short hair with shoulder length, as the target face property features corresponding to the three subclasses, i.e., fringe, curly hair, and hair length.

Figure 5:
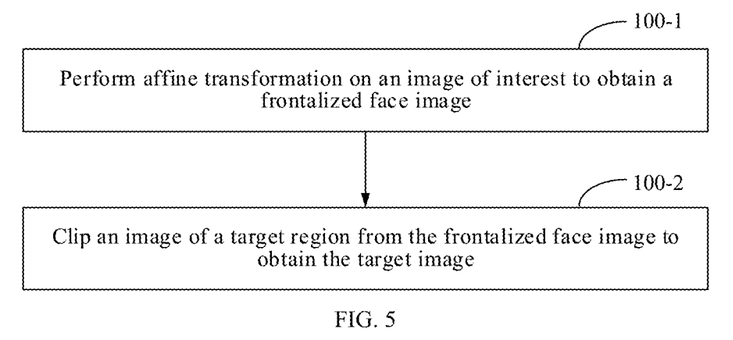
FIG. 5 is a flowchart of another virtual avatar generation method according to an exemplary embodiment of the present disclosure.

In some optional embodiments, for example, as shown in FIG. 5, at least before performing step 102, the virtual avatar generation method may further include the following steps.

At step 100-1, affine transformation is performed on an image of interest to obtain a frontalized face image.

In the embodiments of the present disclosure, the image of interest may be a pre-photographed image including a face, and the face-driven device may perform affine transformation on the image of interest, thereby frontalizing the side face in the image of interest.

At step 100-2, an image of a target region is clipped from the frontalized face image to obtain the target image.

In the embodiments of the present disclosure, the face-driven device may adopt a face feature point positioning method, and the target region includes at least a region where a face key point is located. In this way, an image includes at least the region where a face key point is located may be clipped from the frontalized face image as the target image. The face key points include, but are not limited to, eyebrows, eyes, nose, mouth, facial contour, etc.

Accordingly, when executing step 102, the face-driven device may perform face property analysis on the target image to obtain a target face property feature associated with the target face property of the target image. The method for obtaining the target face property feature is consistent with the method in the foregoing embodiments. Details are not described here again.

In the embodiments of the present disclosure, the target image including the region where the face key point is located may be clipped after face frontalization is performed on the image of interest, and then face property analysis is performed on the target image, so that the face property analysis result is more accurate.

In some optional embodiments, for step 100-2, when the face-driven device clips an image of a target region from the frontalized face image, in addition to the region where the face key point is located, the target region further includes a region with a preset area outside a face part corresponding to the target face property. Optionally, the preset areas outside the face parts corresponding to the different target face properties may be different.

For example, if the target face properties are beards, glasses, or eyelids, the corresponding face parts are mouth, eyebrows, eyes, etc., and the preset areas may be less than half of the area occupied by the corresponding face parts. For example, if the mouth is taken as the target face property, for the target image, not only the region where the mouth is located needs to be clipped, but also the region with the preset area outside the mouth may also be clipped, and the preset area may be less than half of the area of the clipped region where the mouth is located.

For another example, if the target face property is hairstyle, the corresponding face part is facial contour. In this case, in order to avoid deviations when extracting feature information about the hairstyle, the preset area may be half or more of the area of the whole facial contour.

In the foregoing embodiments, in addition to the region where the face key point is located, the target region further includes the region with the preset area outside the face part corresponding to the target face property, thereby improving the accuracy of performing the target face property analysis.

In some optional embodiments, the target neural network may include a plurality of sub-networks corresponding to different face properties. For example, the target neural network includes four sub-networks respectively corresponding to hairstyle, beards, glasses, and eyelids.

Figure 6:
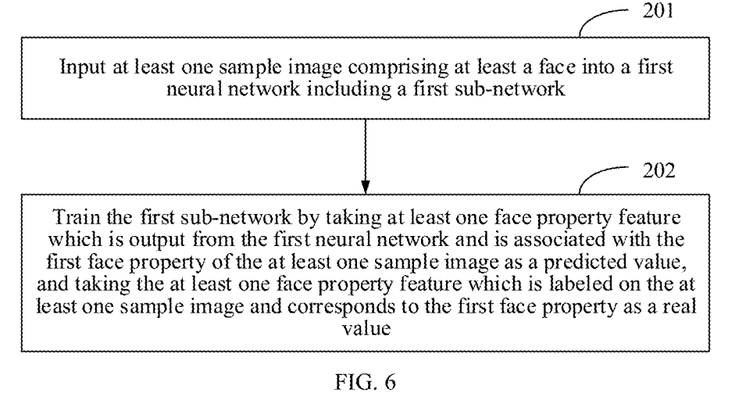
FIG. 6 is a flowchart of another virtual avatar generation method according to an exemplary embodiment of the present disclosure.

In the embodiments of the present disclosure, as shown in FIG. 6, the process of training the target neural network includes the following steps.

At step 201, at least one sample image including at least a face is input into a first neural network. Each of the at least one sample image is labeled with at least one face property feature that is associated with a first face property, and the first neural network includes a first sub-network corresponding to the first face property.

The at least one sample image may be obtained by performing affine transformation on at least one pre-captured image including at least a face, and then clipping an image of a target region.

In the embodiments of the present disclosure, affine transformation is performed on each pre-captured image including at least a face for face frontalization, and then the image of the target region is clipped from the frontalized face image, so as to obtain a corresponding sample image. The target region includes at least a region where a face key point is located.

At step 202, the first sub-network is trained by taking at least one face property feature which is output from the first neural network and is associated with the first face property of the at least one sample image as a predicted value, and taking the at least one face property feature which is labeled on the at least one sample image and corresponds to the first face property as a real value. In this way, the trained first sub-network may be used as the target neural network.

In the embodiments of the present disclosure, the first face property may be any one of a plurality of predefined face properties, for example, may be any one of eyelids, hairstyle, beards, and glasses.

As described above, the face property feature associated with the first face property of the sample image is known. In other words, the sample image may be labeled with the face property features associated with the first face property. For example, assuming that the first face property is beards, the face property features corresponding to the beards on a certain sample image include: no beards in the philtrum, no beards in the center of the jaw, and no beards on both sides of the jaw.

In the embodiments of the present disclosure, at least one face property feature which is output from the target neural network and is associated with the first face property of at least one sample image is taken as a predicted value of the neural network, and at least one face property feature which is labeled on the at least one sample image and corresponds to the first face property is taken as a real value, to optimize network parameters of the first sub-network so as to obtain the first sub-network corresponding to the first face property.

In the embodiments of the present disclosure, a sub-network corresponding to any face property is obtained by training in the manner described above. A plurality of sub-networks constitutes the target neural network.

In some optional embodiments, the sub-network included in the target neural network in the embodiments of the present disclosure may employ a residual network (Res Net). The network structure of the residual network is shown in FIG. 7.

The residual network may include a separate convolutional layer 710. The convolutional layer 710 may be configured to extract basic information and reduce the dimension of a feature map of an input image (e.g., a target image or sample image including at least a face), for example, reducing from three dimensions to two dimensions.

Figure 7:
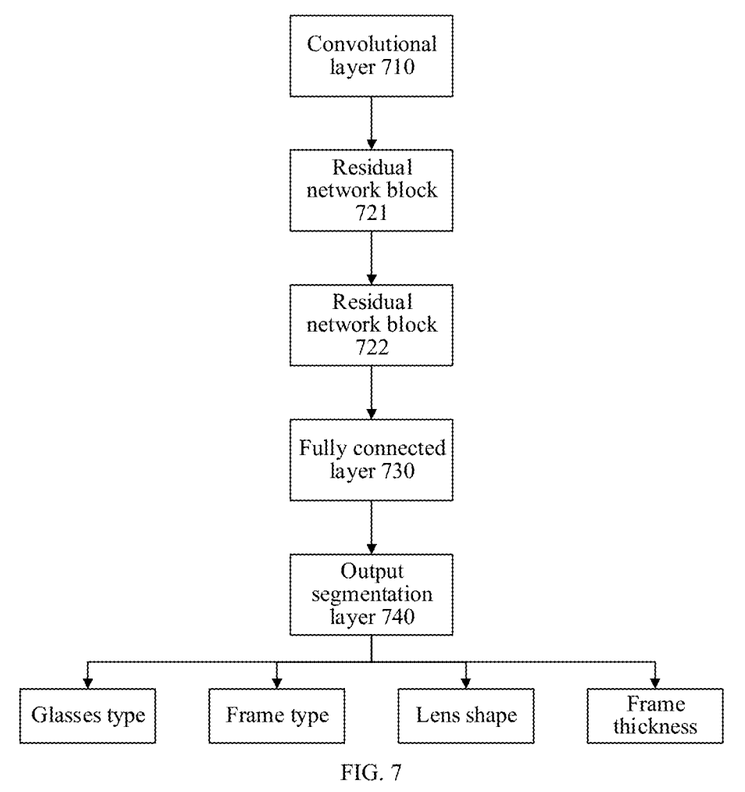
FIG. 7 is an exemplary diagram of a neural network according to an exemplary embodiment of the present disclosure.

As shown in FIG. 7, the depth residual network may further include two residual network blocks (ResNet Blobs) 721 and 722. The ResNet Blobs are structurally characterized by having one residual unit, so that the complexity of the task may be reduced without changing the overall input and output of the task. The ResNet Blob 721 may include a convolutional layer and a batch normalization (BN) layer that may be configured to extract feature information. The ResNet Blob 722 may include a convolutional layer and a BN layer, and may also be configured to extract feature information. However, the ResNet Blob 722 may structurally have one more convolutional layer and BN layer than the ResNet Blob 721, and thus, the ResNet Blob 722 may also be configured to reduce the dimension of the feature map.

In this way, a depth residual network may be utilized to obtain face feature information of the target image accurately. It should be understood that any one of convolutional neural network structures may be used to perform feature extraction processing on the target region of the target image to obtain the feature information of the face image of the target region, and no limitation is made thereto in the present disclosure.

As shown in FIG. 7, the depth residual network may further include a fully connected layer 730. For example, the depth residual network may include three fully connected layers. The fully connected layer 730 may perform dimension reduction processing on the feature information of the face image while preserving useful face property related information.

The depth residual network may further include an output segmentation layer 740. The output segmentation layer 740 may perform output segmentation processing on output of the fully connected layer 730, specifically the last fully connected layer, to obtain an estimated value of at least one face property feature associated with at least one face property subclass. For example, after the output of the last fully connected layer is processed by the output segmentation layer 740, estimated values of at least one face property feature respectively corresponding to the four subclasses (which may be specifically glasses type, frame type, lens shape, and frame thickness) included in the first face property may be obtained, and where the first face property is glasses.

In some optional embodiments, before step 201, it is also possible to perform processing, such as face frontalization on a pre-captured image of interest, and then clip the image of the target region from the frontalized face image, so as to obtain a corresponding sample image. The target region includes at least a region where a face key point is located on the frontalized face image. This process is substantially consistent with the once described in the face property analysis process, and no details are described here again.

In some optional embodiments, when the sample image is clipped, in addition to the region where the face key point is located, the target region further includes regions with preset areas outside the face parts respectively corresponding to different target face properties. This process is also substantially same as the described face property analysis process, and no details are described here again.

In some optional embodiments, after at least one pre-captured image of interest including at least the face is subjected to face frontalization and target region clip, it may also be subjected to at least one processing of translation, rotation, zooming and horizontal flipping, and the obtained processed image is also taken as a sample image for subsequent network training. In this way, a set of the sample images is effectively expanded, and the target neural network obtained by subsequent training can be adapted to more complex scenes of face property analysis.

Corresponding to the foregoing method embodiments, the present disclosure further provides apparatus embodiments.

Figure 8:
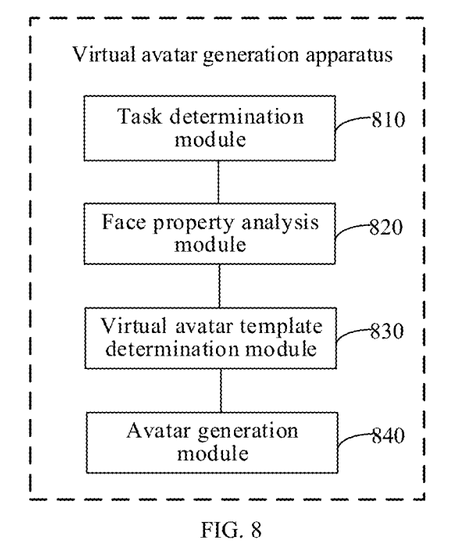
FIG. 8 is a block diagram of a virtual avatar generation apparatus according to an exemplary embodiment of the present disclosure.

As shown in FIG. 8, FIG. 8 is a block diagram of a virtual avatar generation apparatus provided according to some embodiments of the present disclosure. The apparatus includes: a task determination module 810, configured to determine a target task associated with at least one target face property, where the at least one target face property is one of a plurality of predefined face properties, respectively; a face property analysis module 820, configured to perform, according to the target task, target face property analysis on a target image including at least a face, to obtain a target face property feature associated with the target face property of the target image; a virtual avatar template determination module 830, configured to determine a target virtual avatar template corresponding to the target face property feature according to predefined correspondence between face property features and virtual avatar templates; and an avatar generation module 840, configured to generate a virtual avatar of the target image based on the target virtual avatar template.

Figure 9:
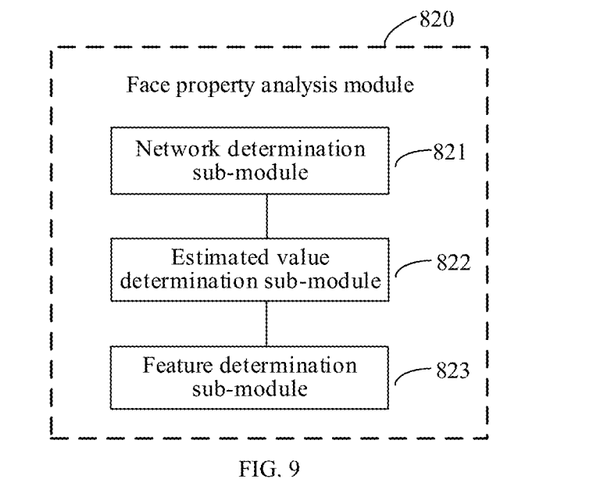
FIG. 9 is a block diagram of another virtual avatar generation apparatus according to an exemplary embodiment of the present disclosure.

In some optional embodiments, as shown in FIG. 9, the face property analysis module 820 includes: a network determination sub-module 821, configured to determine a target neural network corresponding to the target face property; an estimated value determination sub-module 822, configured to input the target image into the target neural network to obtain estimated values output from the target neural network, where the estimated values represent respective probabilities that the target image has one or more face property features associated with the target face property; and a feature determination sub-module 823, configured to take, as the target face property feature, a face property feature corresponding to a maximum value among the estimated values output from the target neural network.

In some optional embodiments, the target face property includes at least one predefined subclass. In this case, the feature determination sub-module 823 is configured to: for a first subclass of the at least one subclass included in the target face property, take, as the target face property feature corresponding to the first subclass, a face property feature corresponding to a maximum value among the estimated values output from the target neural network for the first subclass.

Figure 10:
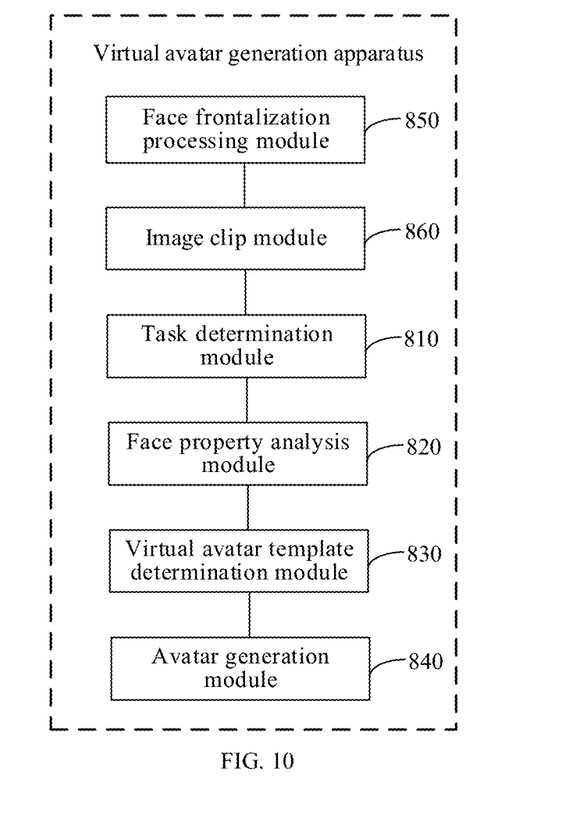
FIG. 10 is a block diagram of another virtual avatar generation apparatus according to an exemplary embodiment of the present disclosure.

In some optional embodiments, as shown in FIG. 10, the apparatus further includes: a face frontalization processing module 850, configured to perform affine transformation on an image of interest to obtain a frontalized face image; and an image clip module 860, configured to clip an image of a target region from the frontalized face image to obtain the target image, where the target region includes at least a region where a face key point is located.

In some optional embodiments, the target region further includes a region with a preset area outside a face part corresponding to the target face property.

Figure 11:
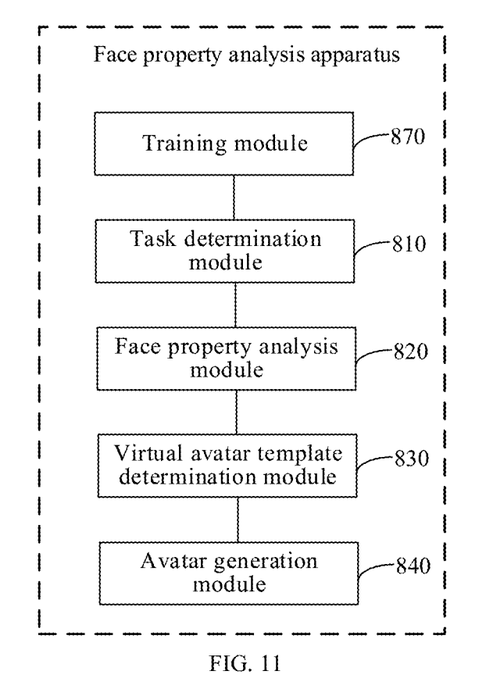
FIG. 11 is a block diagram of another virtual avatar generation apparatus according to an exemplary embodiment of the present disclosure.

In some optional embodiments, the target neural network includes a plurality of sub-networks corresponding to different face properties. In this case, as shown in FIG. 11, the apparatus further includes a training module 870, and the training module is configured to: input at least one sample image including at least a face into a first neural network, where each of the at least one sample image is labeled with at least one face property feature that is associated with a first face property of the plurality of predefined face properties, and the first neural network includes a first sub-network corresponding to the first face property; and train the first sub-network by taking at least one face property feature which is output from the first neural network and is associated with the first face property of the at least one sample image as a predicted value, and taking the at least one face property feature which is labeled on the at least one sample image and corresponds to the first face property as a real value. In this way, the trained first sub-network may be used as the target neural network.

In some optional embodiments, the first sub-network has a network structure of a residual neural network and includes at least one residual unit. Each of the at least one residual unit includes at least one convolutional layer and at least one batch normalization layer.

In some optional embodiments, if the first sub-network includes a plurality of residual units, a number of convolutional layers and a number of batch normalization layers included in a second residual unit of the plurality of residual units both are greater than that included in a first residual unit of the plurality of residual units.

In some optional embodiments, the first sub-network further includes an output segmentation layer, and the output segmentation layer is configured to segment, according to one or more predefined subclasses included in the first face property, feature information extracted from the sample image, to obtain respective estimated values for one or more face property features respectively associated with one or more subclasses.

In some optional embodiments, it is also possible to first performing processing, such as face frontalization, on a pre-captured image of interest, and then clip the image of the target region from the frontalized face image, so as to obtain a corresponding sample image. The target region includes at least a region where a face key point is located on the frontalized face image. This process is substantially consistent with the described process of obtaining a target image from an image of interest, and no details are described here again. In addition, when the sample image is clipped, in addition to the region where the face key point is located, the target region further includes regions with preset areas outside the face parts respectively corresponding to different target face properties.

The apparatus embodiments substantially correspond to the method embodiments, and therefore, for the associated part, refer to the descriptions of the method embodiments. The apparatus embodiments described above are merely exemplary. The units described as separate parts may or may not be physically separate, and parts displayed as units may or may not be physical units, i.e., may be located in one position, or may be distributed on a plurality of network units. Some or all of the modules may be selected according to actual requirements to achieve the objectives of the solutions of the present disclosure. A person of ordinary skill in the art may understand and implement the embodiments without involving creative efforts.

The embodiments of the present disclosure further provide a computer-readable storage medium storing a computer program, and the computer program is configured to implement the virtual avatar generation method according to any one of the foregoing embodiments.

The embodiments of the present disclosure further provide a virtual avatar generation apparatus, including: a processor; and a memory storing instructions executable by the processor; where the processor is configured to invoke the instructions stored in the memory to implement the virtual avatar generation method according to any one of the foregoing embodiments.

Figure 12:
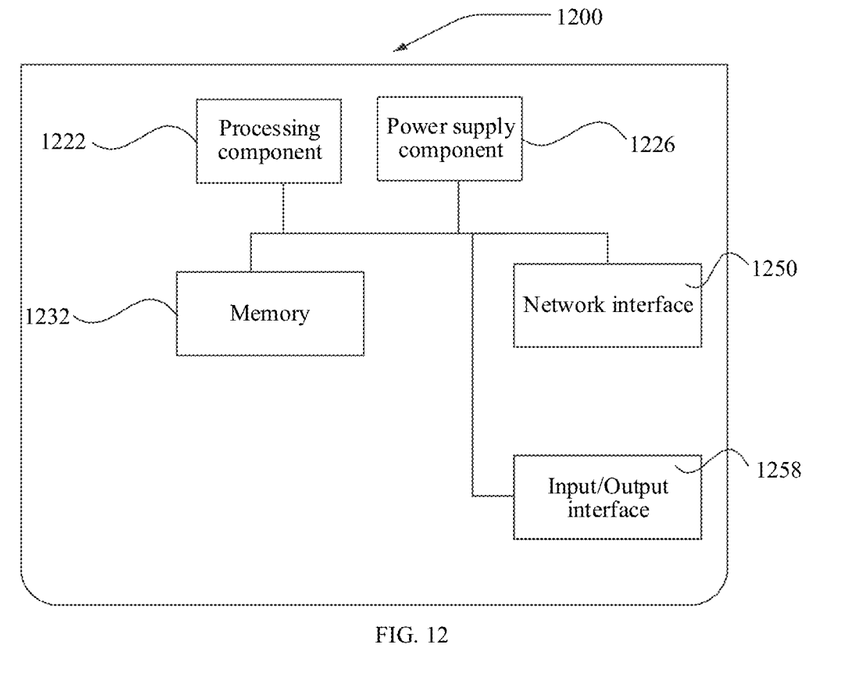
FIG. 12 is a schematic structural diagram of a virtual avatar generation apparatus according to an exemplary embodiment of the present disclosure.

As shown in FIG. 12, FIG. 12 is a schematic structural diagram of a virtual avatar generation apparatus 1200 provided according to some embodiments. For example, the apparatus 1200 may be provided as a virtual avatar generation apparatus to be applied to a face-driven device. Referring to FIG. 12, the apparatus 1200 includes: a processing component 1222 further including one or more processors; and a memory resource represented by a memory 1232, configured to store instructions executable by the processing component 1222, such as, an application program. The application program stored in the memory 1232 may include one or more modules, each of which corresponds to a set of instructions. In addition, the processing component 1222 is configured to execute instructions so as to perform the virtual avatar generation method according to any one of the foregoing embodiments.

The apparatus 1200 may further include: a power supply component 1226, configured to perform power management of the apparatus 1200; a wired or wireless network interface 1250, configured to connect the apparatus 1200 to a network; and an Input/Output (I/O) interface 1258. The apparatus 1200 may operate an operating system stored in the memory 1232, such as Windows Server™, Mac OS X™, Unix™, Linux™, or FreeB SD™.

A person skilled in the art can easily figure out other implementation solutions of the present disclosure after considering the specification and practicing the invention disclosed here. The present disclosure is intended to cover any variations, functions, or adaptive changes of the present disclosure. These variations, functions, or adaptive changes comply with general principles of the present disclosure and include common knowledge or a common technical means in the technical field that is not disclosed in the present disclosure. The specification and the embodiments are merely considered to be exemplary, and the actual scope and spirit of the present disclosure are pointed out by the following claims.

The above descriptions are merely preferred embodiments of the present disclosure but are not intended to limit the present disclosure. Any modification, equivalent replacement, or improvement made without departing from the spirit and principle of the present disclosure shall fall within the scope of protection of the present disclosure.

The invention claimed is:

1. A virtual avatar generation method, comprising:
   determining a target task associated with at least one target face property, wherein the target face property is one of a plurality of predefined face properties, the target face property comprises at least one predefined subclass, and each of the at least one predefined subclass comprises at least one face property feature;
   performing, according to the target task, target face property analysis on a target image comprising at least a face, to obtain a target face property feature associated with the target face property of the target image;
   determining a target virtual avatar template corresponding to the target face property feature according to predefined correspondence between face property features and virtual avatar templates; and
   generating a virtual avatar of the target image based on the target virtual avatar template;
   wherein performing, according to the target task, target face property analysis on a target image comprising at least a face, to obtain a target face property feature associated with the target face property of the target image comprises:
 determining a target neural network corresponding to the target face property;
 inputting the target image into the target neural network to obtain estimated values output from the target neural network, wherein the estimated values represent respective probabilities that the target image has one or more face property features associated with the target face property; and
 for a first subclass of the at least one subclass included in the target face property, taking, as the target face property feature corresponding to the first subclass, a face property feature corresponding to a maximum value among the estimated values output from the target neural network for the first subclass.

2. The method according to claim 1, wherein the target neural network is trained by:
 inputting at least one sample image comprising at least a face into a first neural network, wherein each of the at least one sample image is labeled with at least one face property feature that is associated with a first face property of the plurality of predefined face properties, and the first neural network comprises a first sub-network corresponding to the first face property; and
 training the first sub-network by taking at least one face property feature which is output from the first neural network and is associated with the first face property of the at least one sample image as a predicted value, and taking the at least one face property feature which is labeled on the at least one sample image and corresponds to the first face property as a real value, so as to obtain the target neural network after the training.

3. The method according to claim 2, wherein the first sub-network has a network structure of a residual neural network and comprises at least one residual unit.

4. The method according to claim 3, wherein
 each of the at least one residual unit comprises at least one convolutional layer and at least one batch normalization layer; and
 in a case where the at least one residual unit comprises a plurality of residual units, a number of convolutional layers and a number of batch normalization layers included in a second residual unit of the plurality of residual units both are greater than that included in a first residual unit of the plurality of residual units.

5. The method according to claim 3, wherein
 the first sub-network further comprises an output segmentation layer, and
 the output segmentation layer is configured to segment, according to one or more predefined subclasses included in the first face property, feature information extracted from the sample image, to obtain respective estimated values for one or more face property features respectively associated with the one or more subclasses.

6. The method according to claim 2, further comprising:
 performing affine transformation on an image of interest to obtain a frontalized face image; and
 clipping an image of a target region from the frontalized face image to obtain the target image or the sample image, wherein the target region comprises at least a region where a face key point is located.

7. The method according to claim 6, wherein the target region further comprises a region with a preset area outside a face part corresponding to the target face property.

8. A virtual avatar generation apparatus, comprising:
 a processor; and
 a memory storing instructions executable by the processor,
 wherein the processor is configured to execute the instructions stored in the memory to perform operations comprising:
 determining a target task associated with at least one target face property, wherein the target face property is one of a plurality of predefined face properties, the target face property comprises at least one predefined subclass, and each of the at least one predefined subclass comprises at least one face property feature;
 determining a target neural network corresponding to the target face property;
 inputting a target image comprising at least a face into the target neural network to obtain estimated values output from the target neural network, wherein the estimated values represent respective probabilities that the target image has one or more face property features associated with the target face property; and
 for a first subclass of the at least one subclass included in the target face property, taking, as the target face property feature corresponding to the first subclass, a face property feature corresponding to a maximum value among the estimated values output from the target neural network for the first subclass;
 determining a target virtual avatar template corresponding to the target face property feature according to predefined correspondence between face property features and virtual avatar templates; and
 generating a virtual avatar of the target image based on the target virtual avatar template.

9. The apparatus according to claim 8, wherein the operations further comprise:
 inputting at least one sample image comprising at least a face into a first neural network, wherein each of the at least one sample image is labeled with at least one face property feature that is associated with a first face property of the plurality of predefined face properties, and the first neural network comprises a first sub-network corresponding to the first face property; and
 training the first sub-network by taking at least one face property feature which is output from the first neural network and is associated with the first face property of the at least one sample image as a predicted value, and taking the at least one face property feature which is labeled on the at least one sample image and corresponds to the first face property as a real value, so as to obtain the target neural network after the training.

10. The apparatus according to claim 9, wherein the first sub-network has a network structure of a residual neural network and comprises at least one residual unit.

11. The apparatus according to claim 10, wherein
 each of the at least one residual unit comprises at least one convolutional layer and at least one batch normalization layer; and
 in a case where the at least one residual unit comprises a plurality of residual units, a number of convolutional layers and a number of batch normalization layers included in a second residual unit of the plurality of residual units both are greater than that included in a first residual unit of the plurality of residual units.

12. The apparatus according to claim 10, wherein
 the first sub-network further comprises an output segmentation layer, and the output segmentation layer is configured to segment, according to one or more predefined subclasses included in the first face property, feature information extracted from the sample image, to obtain respective estimated values for one or more face property features respectively associated with the one or more subclasses.

13. The apparatus according to claim 9, wherein the operations further comprise:
performing affine transformation on an image of interest to obtain a frontalized face image; and
clipping an image of a target region from the frontalized face image to obtain the target image or the sample image, wherein the target region comprises at least a region where a face key point is located.

14. The apparatus according to claim 13, wherein the target region further comprises a region with a preset area outside a face part corresponding to the target face property.

15. A non-transitory computer-readable storage medium storing a computer program which, when executed by one or more processors, causes the one or more processors to perform operations comprising:
determining a target task associated with at least one target face property, wherein the target face property is one of a plurality of predefined face properties, the target face property comprises at least one predefined subclass, and each of the at least one predefined subclass comprises at least one face property feature;
determining a target neural network corresponding to the target face property;
inputting a target image comprising at least a face into the target neural network to obtain estimated values output from the target neural network, wherein the estimated values represent respective probabilities that the target image has one or more face property features associated with the target face property; and
for a first subclass of the at least one subclass included in the target face property, taking, as the target face property feature corresponding to the first subclass, a face property feature corresponding to a maximum value among the estimated values output from the target neural network for the first subclass;
determining a target virtual avatar template corresponding to the target face property feature according to predefined correspondence between face property features and virtual avatar templates; and
generating a virtual avatar of the target image based on the target virtual avatar template.

* * * * *